Sept. 11, 1934.  F. C. AREY  1,973,367
STEAM ENGINE
Filed Aug. 3, 1931   5 Sheets-Sheet 1

Inventor:
Fred C. Arey,
By Wm. F. Freudenreich,
Atty.

Sept. 11, 1934.  F. C. AREY  1,973,367
STEAM ENGINE
Filed Aug. 3, 1931  5 Sheets-Sheet 2
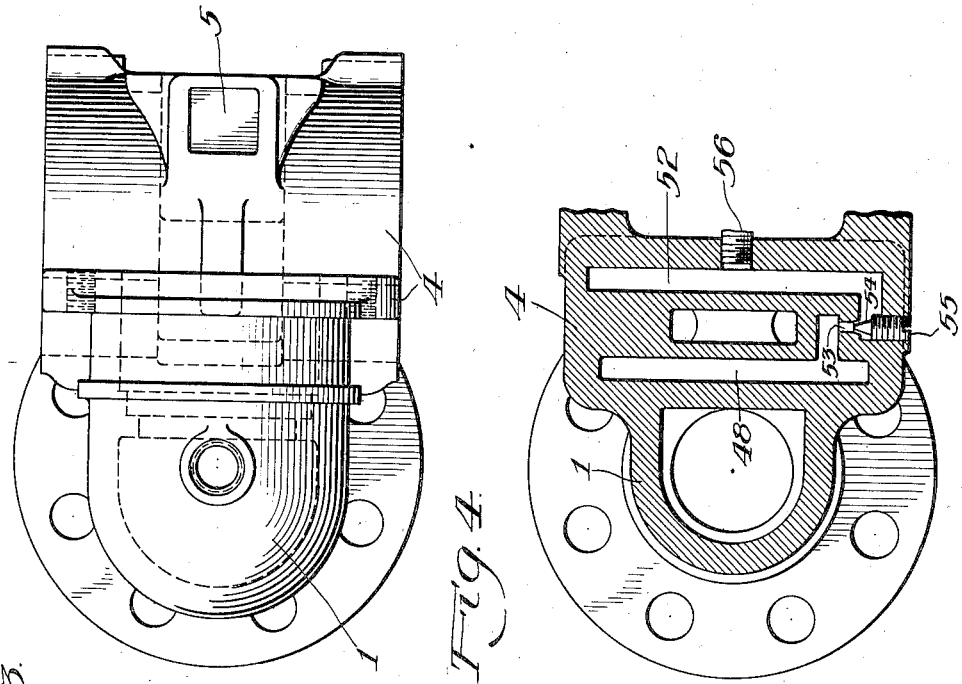
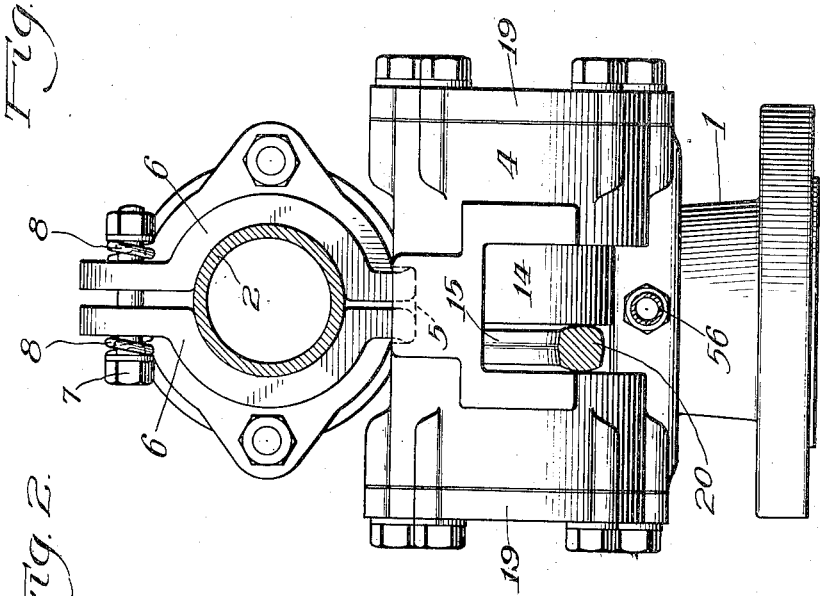
Inventor:
Fred C. Arey,
By Wm F. Freudenreich,
Atty.

Sept. 11, 1934.   F. C. AREY   1,973,367
STEAM ENGINE
Filed Aug. 3, 1931   5 Sheets-Sheet 3

Inventor:
Fred C. Arey,
By Wm. F. Freudenreich,
Atty.

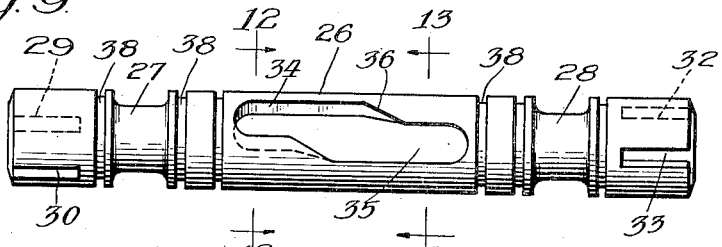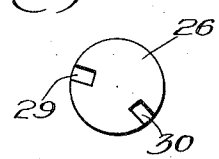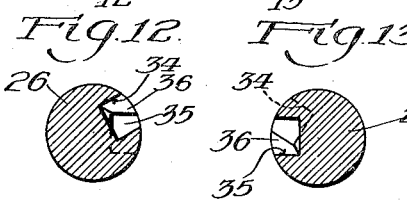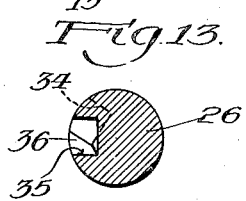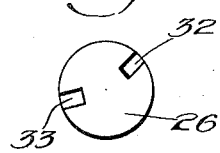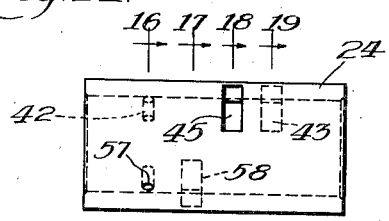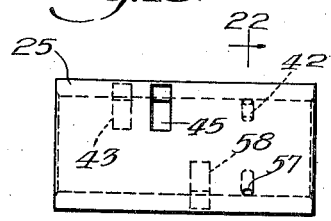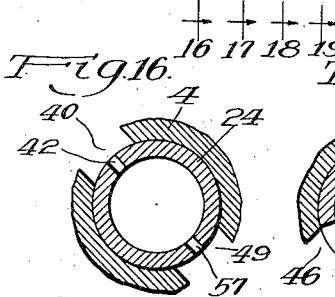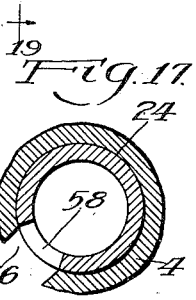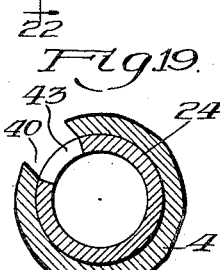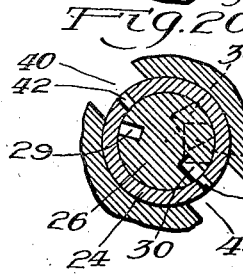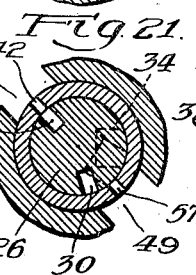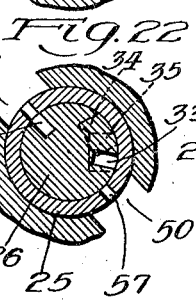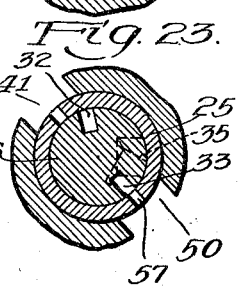

Sept. 11, 1934.  F. C. AREY  1,973,367

STEAM ENGINE

Filed Aug. 3, 1931  5 Sheets-Sheet 5

Inventor:
Fred C. Arey,
By Wm. F. Freudenreich,
Atty.

Patented Sept. 11, 1934

1,973,367

UNITED STATES PATENT OFFICE 1,973,367

STEAM ENGINE

Fred C. Arey, Oak Park, Ill., assignor to The Vulcan Soot Cleaner Company, Du Bois, Pa., a corporation of Delaware Application August 3, 1931, Serial No. 554,759

2 Claims. (Cl. 121—153)

The present invention has for its object to produce a simple, rugged and reliable reciprocating engine, of the steam engine type, particularly adapted for use in operating the cleaning elements of soot blowers, although useful for other purposes.

When my improved engine is employed to operate the cleaning element of a soot blower, it is preferably built in as a part of the power head unit and, therefore, viewed in one of its aspects, my invention may be said to have for its object to produce a simple and novel power head for a soot cleaner.

The only work that is required of an engine to operate a cleaner element of the usual type is that of turning the element step by step, first in one direction and then in the other. Normally, therefore, the load on the engine is not great. However, the tubular cleaning elements are subjected to intense heat and often bend under the action of this heat, so that considerable power is required to turn the same. One of the objects of the present invention is to produce an engine which always receives enough steam to exert the maximum effort that may be required of it, and yet will operate at a normal speed and be prevented from racing when the load is light.

Figure 1:
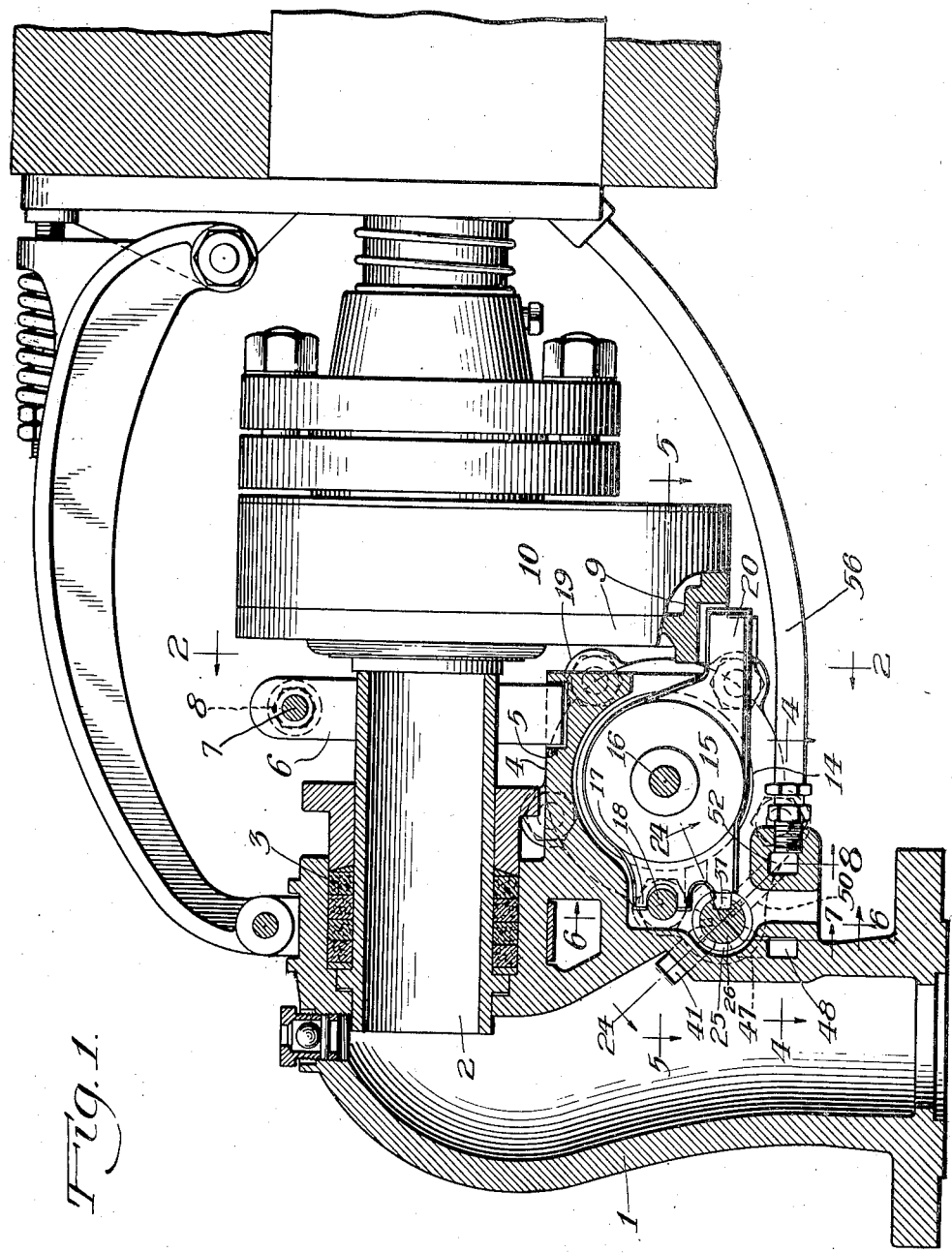
Figure 5:
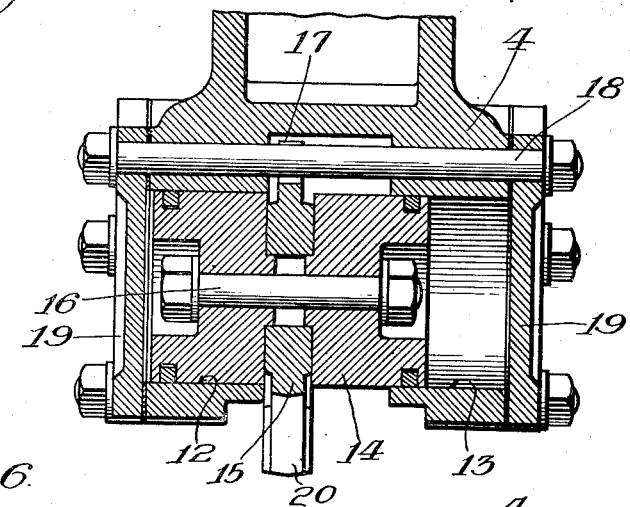
Figure 6:
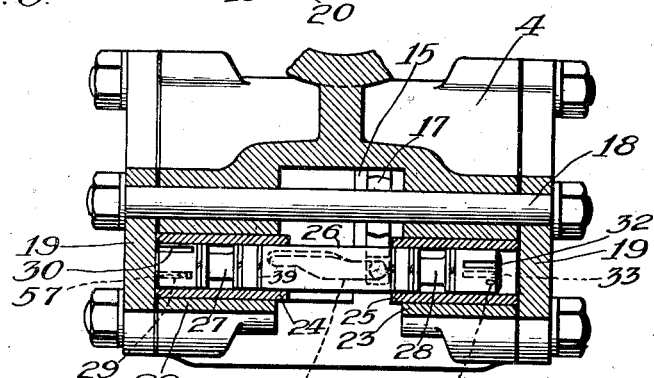
Figure 7:
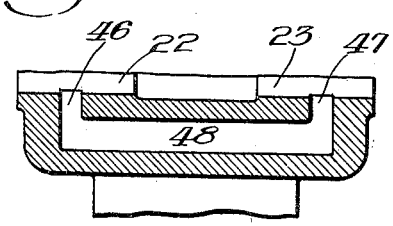
Figure 8:
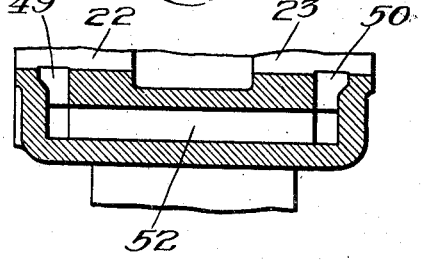
Figure 24:
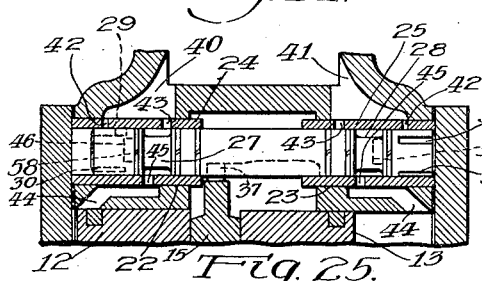
Figure 26:
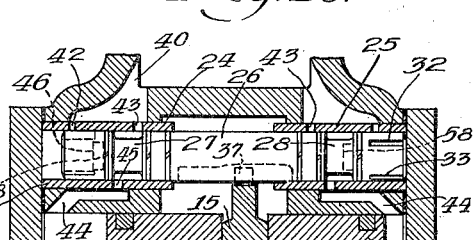
Figure 25:
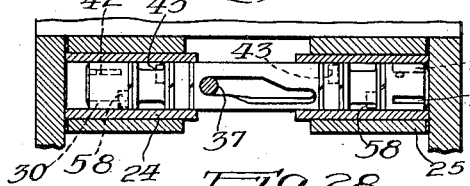
Figure 27:
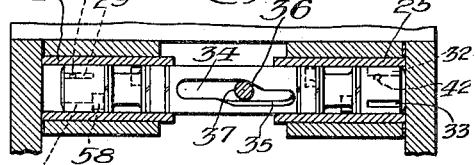
Figure 28:
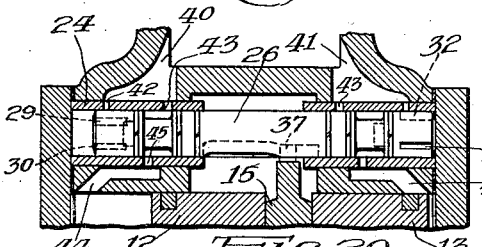
Figure 30:
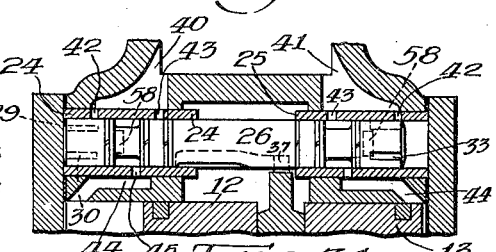
Figure 29:
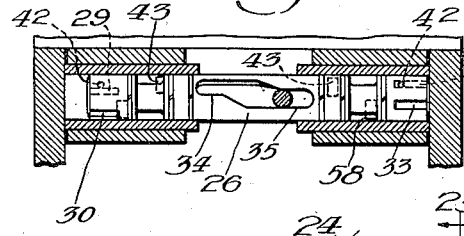
Figure 31:
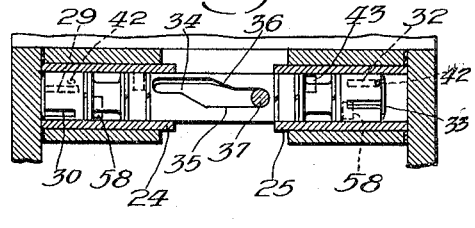
Figure 32:
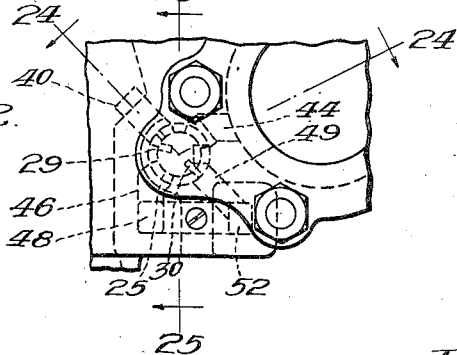

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view, partly in section and partly in elevation, showing a power head embodying my improvements mounted on a furnace wall; Fig. 2 is a section on line 2—2 of Fig. 1; Fig. 3 is a top plan view of the main casting of the head; Fig. 4 is a section on line 4—4 of Fig. 1; Fig. 5 is a section on line 5—5 of Fig. 1; Fig. 6 is a section on line 6—6 of Fig. 1; Figs. 7 and 8 are sections taken, respectively, on lines 7—7 and 8—8 of Fig. 1; Fig. 9 is an elevation of the steam valve, on a larger scale than in the preceding figures; Figs. 10 and 11 are end views of the valve; Figs. 12 and 13 are sections taken, respectively, on lines 12—12 and 13—13 of Fig. 9; Figs. 14 and 15 are elevations of the two sleeves or cylinders in which the valve of Fig. 9 reciprocates and oscillates; Figs. 16, 17, 18 and 19 are sections taken, respectively, on lines 16—16, 17—17, 18—18 and 19—19 of Fig. 14, fragments of the engine block around the sleeve being shown; Fig. 20 is a section, on the same plane as Fig. 16, including, however, the valve as well as a fragment of the engine block surrounding the sleeve; Fig. 21 is a view similar to Fig. 20, showing the valve in a different angular position than in Fig. 20; Figs. 22 and 23 are views similar and corresponding to Figs. 20 and 21, showing, however, the opposite end of the valve, the section being on line 22—22 of Fig. 15; Fig. 24 is a section on line 24—24 of Fig. 1, and also on line 24—24 of Fig. 32; Fig. 25 is a section on line 25—25 of Fig. 32, showing the valve in the same position as in Fig. 24; Figs. 26 and 27 are views corresponding to Figs. 24 and 25, showing the condition of the parts when the piston nears the end of the stroke that carries it from the left-hand end of the cylinder to the right-hand end; Figs. 28 and 29 are views similar to and corresponding to Figs. 24 and 25, showing the parts in the positions which they occupy at the instant that the piston is completing the stroke which has been only partially completed in Fig. 26; Figs. 30 and 31 are views similar and corresponding to Figs. 24 and 25, showing the parts at the opposite extremes from those illustrated in Figs. 24 and 25, so that the piston is ready to start toward the left, whereas in Fig. 24 it is ready to begin moving toward the right; and Fig. 32 is an end elevation of a fragment of the engine block.

Referring to the drawings, 1 represents a hollow head into the side of which, adjacent to one end, extends the open end of a tubular cleaning element 2 so as to receive the cleaning fluid, usually steam, directly from the head. The joint between the cleaning element and the head is suitably packed, as indicated at 3, so as to be fluid-tight, while permitting the cleaning element to turn. On the same side of the head as that from which the cleaning element extends, and preferably integral with the head, is an engine block 4. In the top of the block 4 is a pocket or recess 5 into which extend corresponding ends of a pair of curved brake shoes 6 that embrace the cleaning element. The opposite ends of the shoes are connected by a suitable bolt 7 applying pressure through a spring or springs 8, so as yieldingly to clamp the shoes upon the cleaning element. The purpose of this brake is to prevent the cleaning element from turning backward while suitable pawl and ratchet mechanism is backing off to take a new grip preparatory to turning the cleaning element through a step of predetermined angular length. As the present invention is not concerned with the details of the pawl and ratchet mechanism, I have shown only its operating arm 9 and housing 10; the arm 9 extending radially from the cleaning element past and into proximity to the engine block. The engine block is bored out to provide a cylinder, conveniently made in two sections 12 and 13 axially aligned but spaced apart from each other. In this cylinder, as best shown in Fig. 5, is a piston 14 made in two sections lying on opposite sides of a heavy plate 15, the cylinder elements and the plate being rigidly united into a single unit by a heavy bolt 16. The piston is held against turning through the engagement of a fork 17 on the plate 15 with a long bar 18 extending parallel to the long axis of the cylinder. The bar 18 may conveniently be a long bolt which assists in holding the cylinder heads 19, 19 in place. The plate 15 has, on the side opposite that on which the fork 17 is located, a projection 20 that engages with the actuating arm 9 so that, as the piston reciprocates, the tubular cleaning element is caused to turn step by step.

In the engine block, parallel to the power cylinder, is a second cylinder, much smaller in diameter, containing the main valve. The second cylinder is also conveniently composed of two section 22 and 23, corresponding to the sections 12 and 13 of the other cylinder. The sections of the smaller cylinder are lined with sleeves 24 and 25 of non-corrosive metal pressed into the same and containing the necessary ports cooperating with the valve 26 movably fitted in the sleeves. The valve is best shown in Figs. 9 to 13. It consists in the main of a long cylindrical member having near each end a short section of reduced diameter, as indicated at 27 and 28. In the end portions of the valve, beyond the sections 27 and 28, are peripheral grooves extending lengthwise of the valve from the extreme ends. That end of the valve that cooperates with the sleeve 24 has two of these peripheral grooves, as indicated at 29 and 30, whereas the other end has the peripheral grooves 32 and 33. The angular spacing between the grooves 29 and 30 is the same as that between the grooves 32 and 33, but one set of grooves is displaced angularly of the other set. In the middle portion of the valve is a longitudinal cam slot consisting of parallel end sections 34 and 35, offset from each other angularly of the valve, and connected by an inclined section 36. As best seen in Fig. 1, the member 15 of the main piston element has thereon a cam roll 37 that extends into the cam slot in the valve. Therefore, as the main piston reciprocates, the cam slot being at least as long as the stroke of the piston, the valve will be caused to turn whenever the cam roll reaches the inclined section of the cam slot, and is held against turning by the cam roll whenever the latter is in one of the straight end portions of the cam slot. It should also be noted that the valve is provided with a number of grooves 38 extending around the same. In each of these grooves, as shown in Fig. 6, is a little piston ring 39. There should be at least four of these piston rings, one at each end of each section of reduced diameter, although I have shown two additional rings near opposite ends of the cam slot. The purpose of the valve is, of course, to admit steam to and exhaust it from the main cylinder. However, the valve itself acts as a piston by means of which it is shifted in the lengthwise direction after being turned through the action of the main piston. The sleeves 24 and 25 must, therefore, be provided with the proper ports, communicating with proper steam and exhaust passages, to bring about the desired results.

The main casting contains two steam passages 40 and 41 leading from the interior of the hollow head to the cylinder containing the valve. Each of the sleeves 24 and 25 has therein two ports 42 and 43, communicating with the corresponding steam passage. There is also a large passage 44 leading from each cylinder section 22 and 23 to the corresponding end of the main cylinder. Each valve sleeve has therein a port 45 communicating with the corresponding passage 44. The ports 42, 43 and 45, at each end of the valve device, are displaced from each other lengthwise of the valve device.

The passages 44 are combined inlet and exhaust passages, but, in addition to these passages and the steam inlet passages, it is necessary also to have exhaust passages to carry steam to a discharge point. There are two such exhaust passages at each end of the valve device, one for carrying away the steam that moves the valve lengthwise, and the other for carrying away the exhaust steam from the engine cylinder. The exhaust passages to which I have referred are on the under side of the valve, as viewed in Fig. 1. Two of the passages, 46 and 47, lead from the cylinders 22 and 23 to a chamber 48 in the body of the casting. Two other passages 49 and 50 lead from the cylinders 22 and 23 to a second chamber 52. The passages 46 and 49, at one end, and the passages 47 and 50, at the other end, are not only displaced angularly, but also lengthwise of the valve device. As best shown in Fig. 4, the chambers 48 and 52 communicate with each other through a port 53. This port is controlled by a conical valve 54 on the end of a plug 55 screwed into the engine block from the exterior, and, therefore, accessible from outside the engine. By screwing the plug in or out, the effective area of the port 53 may be decreased or increased. It may be stated here that the exhaust steam from the main cylinder of the engine first enters the chamber 48 and then must pass through the port 53 and into the chamber 52 before it can finally escape through a discharge pipe 56. Therefore, by adjusting the plug valve, the rate at which the exhaust steam can escape may be controlled; thereby making it possible to prevent too rapid an exhaust and, therefore, too rapid a reciprocation of the main piston. It may also be noted that the motive steam for the valve itself, as will hereinafter be explained, enters directly into the chamber 52, so that the lengthwise movements of the valve are not retarded and the valve may travel rapidly from one extreme position to the other.

As best seen in Figs. 14–19, each of the sleeves 24 and 25 has diametrically opposite the port 42 a similar port 57. Whereas each port 42 registers with the corresponding steam passage 40 or 41, the port 57 registers with the corresponding exhaust passage 49 or 50. Whenever peripheral groove 29 or 32 at either end of the valve registers with its port 42, steam may enter the valve cylinder through this groove and behind the corresponding end of the valve so as to force the valve toward the other end of the cylinder. Such movement of the valve is made possible only through the ability of the opposite end of the valve cylinder to exhaust through its longitudinal groove 30 or 33 which at that time must register with its exhaust port 57. Each valve sleeve contains a fifth port 58 which registers with the exhaust passages 46 or 47, as the case may be.

The relative proportioning and positioning of the parts may perhaps be best explained by following through a cycle of operations. In Figs. 24 and 25, the piston is shown at the left-hand end of the cylinder, whereas the valve is at the right-hand limit of its movement. It will be seen that the exhaust port for the right-hand end of the cylinder, namely, the port 58, lies directly behind the part of reduced diameter 28 of the valve, so that the steam from the right-hand end of the cylinder has been able to flow through the right-hand passage 44, the port 45, the interior of the sleeve 25, through the port 58 and thence through exhaust passage 47 to the chamber 48; flowing from the chamber 48 through the control port 53 and then into the chamber 52 and out of the discharge or waste pipe 56. The reduced part 27 of the valve uncovers the ports 43 and 45 at the left-hand end of the valve device, so that steam can now pass through the passage 40, ports 43 and 45, into the left-hand passage 44 and behind the piston. Consequently, the piston will start to travel toward the right. At this time, before the piston begins to move, the cam roll is at the left-hand end of the left-hand straight portion 34 of the cam slot, holding the valve in the angular position indicated in Fig. 21, in which the groove 29 in the valve registers with the port 42, whereby steam is admitted behind the left-hand end of the valve and holds it at the right-hand limit of its movement. Furthermore, as also shown in Fig. 21, the peripheral groove 30 is angularly displaced with respect to the exhaust port 57, so that no steam can escape from behind the valve. At the other end of the valve, the peripheral groove 32 is angularly displaced from the steam port 42, whereas the peripheral groove 33 registers with the corresponding exhaust port 57, all as shown in Fig. 23. Consequently, the steam has escaped from behind the right-hand end of the valve. As the piston moves from the position shown in Figs. 24 and 25 to that of Figs. 26 and 27, the cam roll simply travels along the straight section 34 of the cam slot without affecting the position of the valve. As soon as the cam roll strikes the inclined section 36 of the cam slot, further movement of the piston causes the valve to be turned, as indicated in Figs. 28 and 29. The cam roll is now in the right-hand straight portion 35 of the cam slot and the piston is substantially at the right-hand end of its movement.

As soon as the valve is turned from the position represented by Figs. 21 and 23 to that represented by Figs. 20 and 22, steam is admitted behind the right-hand end of the valve, whereas the left-hand end of the valve cylinder is connected to the exhaust port 57; the exhaust port at the right-hand end of the valve cylinder and the steam admission port at the left-hand end of the cylinder being closed. Therefore, the valve will be forced toward the left into the positions illustrated in Figs. 30 and 31; the steam behind the left-hand end of the valve offering no resistance to such movement, because it can escape freely through the exhaust port. This lengthwise shifting of the valve uncovers the exhaust port 58 at the left, while closing the corresponding steam admission port 43. Therefore, steam can exhaust from behind the left-hand end of the piston. At the same time, the exhaust port 58 at the right-hand end is covered and the admission port 43 is uncovered. Therefore, steam can enter the main cylinder behind the right-hand end of the piston, causing the piston to travel back into the position illustrated in Fig. 24. As the piston travels back, it again turns the valve, just before reaching the limit of its movement toward the left; whereupon steam will be admitted behind the left-hand end of the valve and the valve be driven toward the right into the position illustrated in Figs. 24 and 25.

As heretofore explained, the exhaust from the valve cylinder is directly into the chamber 52 which discharges to atmosphere, whereas the exhaust from the main cylinder is into the chamber 48 and must pass through the throttling port 53 before it can escape freely. Therefore, the lengthwise movements of the valve will be rapid, whereas the reciprocatory movements of the piston will be at a rate depending upon the adjustment of the throttling valve 54. If the throttling valve be screwed outward so as not to restrict the effective area of the port 53, the movements of the piston will be rapid, because the steam head of the piston will not offer any considerable resistance to movement caused by the steam behind the piston to drive it ahead. As the throttling valve is screwed in, the steam exhausting from the engine cylinder meets greater and greater resistance and thus slows down the movement of the piston. Consequently, by properly adjusting the throttling valve, the engine may be caused to run at any desired speed, even under the lightest of loads. In other words, the exhaust steam may be utilized as a cushion that produces more or less of a dash pot action. Although the partial closing of the throttling valve slows down the speed of the engine, it does not correspondingly reduce its power to operate when a heavy load is thrown upon the same. When the load is great, the piston will simply travel more slowly than where the load is light, thus permitting the steam to exhaust ahead of the piston more rapidly in relation to the movement of the piston than would otherwise be the case.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In an engine, two parallel cylinders, a reciprocatory piston in one cylinder, a piston valve fitted in the second cylinder to reciprocate and also turn therein, said valve having in the side thereof a longitudinal cam slot composed of parallel end sections offset from each other angularly of the valve and a diagonal connecting section, and an element projecting from the middle of said piston extending into said cam slot.

2. In an engine, two parallel cylinders, a reciprocatory piston in one cylinder, a cylindrical valve in the other cylinder adapted to reciprocate and also to turn about its long axis, said valve having in the side thereof a longitudinal cam slot composed of parallel end sections offset from each other angularly of the valve and a diagonal connecting section, an element fixed to the middle of said piston and extending into said cam slot, a guide parallel with the long axes of said cylinders, and a member rigidly connected to said piston and interlocked with said guide to prevent the piston from turning.

FRED C. AREY.

CERTIFICATE OF CORRECTION.

Patent No. 1,973,367.   September 11, 1934.

FRED C. AREY.

It is hereby certified that the above numbered patent was erroneously issued to "The Vulcan Soot Cleaner Company, Du Bois, Pennsylvania, a corporation of Delaware" whereas said patent should have been issued to Vulcan Soot Blower Corporation, of Du Bois, Pennsylvania, a corporation of Pennsylvania, as assignee by mesne assignments of the entire interest in said invention as shown by the records of assignments in this office; and that the said Letters Patent should be read with this correction therein that the same may conform to the record of the case in the Patent Office.

Signed and sealed this 9th day of October, A. D. 1934.

Leslie Frazer (Seal)   Acting Commissioner of Patents.